(12) United States Patent
Brunström et al.

(10) Patent No.: US 7,710,495 B2
(45) Date of Patent: May 4, 2010

(54) PORTABLE COMMUNICATION APPARATUS WITH CAMERA AND EXTENDED OPTICAL PATH

(75) Inventors: Leif Brunström, Järfälla (SE); Björn Norhammar, Taby (SE); Tomas Pensjö, Järfälla (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1002 days.

(21) Appl. No.: 10/529,693

(22) PCT Filed: Aug. 20, 2003

(86) PCT No.: PCT/EP03/09207

§ 371 (c)(1),
(2), (4) Date: Dec. 22, 2005

(87) PCT Pub. No.: WO2004/030345

PCT Pub. Date: Apr. 8, 2004

(65) Prior Publication Data

US 2006/0125915 A1 Jun. 15, 2006

Related U.S. Application Data

(60) Provisional application No. 60/417,418, filed on Oct. 9, 2002.

(30) Foreign Application Priority Data

Sep. 30, 2002 (EP) .................................. 02021960

(51) Int. Cl.
*H04N 5/225* (2006.01)
(52) U.S. Cl. .................................. 348/373; 455/575.3

(58) Field of Classification Search ............... 348/373, 348/374, 375, 376, 369, 337, 335, 340, 552; 455/575.3, 556.1, 575.1, 90.3; 359/831, 359/522, 384, 833, 811, 815, 212.1, 211.5; 385/146; 362/551
See application file for complete search history.

(56) References Cited

U.S. PATENT DOCUMENTS

| 5,491,507 A | 2/1996 | Umezawa et al. |
| 6,137,525 A | 10/2000 | Lee et al. |
| 6,339,508 B1 * | 1/2002 | Nozawa et al. ............... 359/686 |

(Continued)

FOREIGN PATENT DOCUMENTS

CN 1302152 A 7/2001

(Continued)

*Primary Examiner*—Lin Ye
*Assistant Examiner*—Nelson D. Hernández Hernández
(74) *Attorney, Agent, or Firm*—Renner, Otto, Boisselle & Sklar, LLP

(57) ABSTRACT

A portable communication apparatus (1) comprises a first housing portion (2) and a second housing portion (3), a rotary support member (6) rotatably connecting the first housing portion and the second housing portion, an image producing apparatus (7), and an optical input (8) for the image producing apparatus located in the support member. The image producing apparatus (7) is located in the first housing portion (2) or the second housing portion (3) of the portable communication apparatus (1), and an optical arrangement (11) extends an optical path (12) of the image producing apparatus from the first housing portion or the second housing portion to the optical input (8) located in the rotary support member (6).

5 Claims, 4 Drawing Sheets

U.S. PATENT DOCUMENTS

| | | |
|---|---|---|
| 7,046,287 B2 | 5/2006 | Nishino et al. |
| 7,436,599 B2 * | 10/2008 | Mihara et al. ............... 359/676 |
| 2001/0005454 A1 | 6/2001 | Nishino et al. |
| 2002/0067426 A1 * | 6/2002 | Nagata et al. ............... 348/373 |
| 2003/0155216 A1 * | 8/2003 | Park et al. .................. 200/5 R |

FOREIGN PATENT DOCUMENTS

| | | |
|---|---|---|
| EP | 0898405 | 2/1999 |
| EP | 1111919 | 6/2001 |
| JP | 2000-253124 | 9/2000 |

\* cited by examiner

PORTABLE COMMUNICATION APPARATUS WITH CAMERA AND EXTENDED OPTICAL PATH

This patent application claims the benefit of priority from U.S. Provisional Patent Application Ser. No. 60/417,418 filed on Oct. 9, 2002. This application incorporates by reference the entire disclosure of U.S. Provisional Patent Application Ser. No. 60/417,418.

TECHNICAL FIELD

The present-invention relates to the field of information communication and, in more particular to a portable communication apparatus comprising an internal camera.

PRIOR ART

Examples of a portable communication apparatus as set out above are a mobile telephone, a cordless telephone, a portable digital assistant (PDA), a communicator, or a portable navigating device. Among these, the mobile or cellular telephone is currently believed to be the most prominent in terms of market penetration and sales volumes. Therefore, for the rest of this document, reference will be made to a mobile or cellular telephone for any commercially available mobile communications network, such as GSM (Global System for Mobile service), UMTS (Universal Mobile Telecommunication Service), or D-AMPS (Digital-Advanced Mobile Phone Service). However, the invention is not limited to merely a mobile telephone. On the contrary, the invention is best defined by the appended independent patent claims.

The use of mobile communication devices is increasing rapidly. The introduction of the second generation wireless technology (2G), also usually identified as GSM, provided many new services to the users of the system and made it possible to transfer speech information with an enhanced sound quality compared to earlier communication systems. In addition to this, a user of the GSM system can also travel abroad and still use his/her mobile telephone thanks to what is known as "roaming", i.e. a group of cellular telephone service providers cooperate and provides services to users that are registered with the other service providers in that same group.

The bandwidth required for transferring speech information in a communication system is normally relatively narrow. In case of the GSM system, a user shares a 200 kHz bandwidth with eight other users using a TDMA (Time Division Multiple Access) scheme. This bandwidth is sufficient for speech transfer, but it is not well-suited for communication of larger amounts of data such as video streams or images.

In order to provide the user with a higher bandwidth, a packet-switched wireless communication service known as GPRS (General Packet Radio Services) has been introduced which provides data rates from 56 up to 114 Kbps continuous connection to a network such as the Internet. GPRS is based on GSM communication and will complement existing services e.g. circuit—switched cellular phone connections and SMS (Short Message Service).

The third generation wireless technology, also known as 3G, includes capabilities to transfer multimedia components, i.e. voice, data, and video. It also provides a broad bandwidth and high speed (upwards of 2 Mbps), routing flexibility (repeater, satellite, LAN), and roaming capability throughout Europe, Japan, and North America As mentioned above, the broad bandwidth provided by the modern wireless technology has made it possible to transfer video or still images. Consequently, a mobile communication apparatus that is to be used for transmitting images needs to include a video camera or still camera which makes the design of the communication apparatus more complex. The camera needs to be small in order to be arranged in the communication apparatus, and the actual mounting of the camera has to be done in a way which makes it possible for the user of the communication apparatus to direct the camera in different directions, i.e. the camera should be possible to direct towards the user when he is using the communication apparatus to communicate with another person face-to-face, and in an opposite direction when the user wants to use the communication apparatus as a camera.

In order to provide a small, compact communication apparatus, the communication apparatus is normally made up from two portions that are rotatably connected by means of a rotary support member, such as a hinge. The camera is then mounted in the hinge for being able to be directed towards different locations.

EP 0 898405 A2 discloses an information communication terminal device comprising two portions that are rotatably connected by means of a hinge. The device has a video camera built into the hinge, wherein the camera may be rotated round an axis parallel to the axis of the hinge. The video camera and its associated electronic circuitry according to EP 0 898405 has to be very small in order to fit into the hinge of the communication terminal device. In addition, the design of the hinge will be very complex since it has to accommodate both the camera and the rotary parts. Moreover, the camera in the hinge has to be connected to at least some of the electronic circuitry in the rest of the communication terminal device, i.e. cables must run from the hinge to the first or second portion of the communication device. The accommodation of the camera, camera electronics and wiring implies that the hinge will be even more complex in its design and that there will be no space for other useful electronics in the hinge.

The patent document JP A 2000 253124 discloses a communication device similar to the device disclosed in EP 0 898405. The communication device comprises two parts that are rotatably connected by means of a hinge. A camera mounted in a section of the hinge which is larger in diameter than the rest of the hinge. According to the document it is possible to rotate the section of the hinge that accommodates the camera.

One drawback with the solution according to JP A 2000 253124 is that the camera and its associated electronics is mounted in the hinge. Similarly to EP 0 898405, the design of the hinge becomes very complex and no space will be available for accommodating other electronics.

Besides being very constructional complex, the prior art techniques used for providing a camera in the hinge of a mobile communication device makes it cumbersome to direct the camera in a desired direction. More specifically, if the user wants to turn the camera in a certain direction relative the housing of the communication apparatus, he or she has to use a separate knob at the side of the housing in order to perform the movement of the camera. For example, if the user has used the camera when communicating with another person, i.e. the camera in the hinge has been directed towards the user when the communication device was in an unfolded position, the optical input of the cameras according to the prior art will be blocked by the housing of the apparatus, when the communication apparatus is folded, and hence not usable unless they are turned by means of the knob on the side of the communication apparatus.

The user of the communication apparatus will generally only use the camera at two different occasions—when he or she is communicating with a friend (by means of video and audio), or when he or she is taking pictures (as with an ordinary camera). Thus, the camera will normally only be used when the communication apparatus is in an unfolded and completely folded state respectively. The prior art solutions do not provide a easy way to accomplish the above alignment of the camera.

SUMMARY OF THE INVENTION

It is an object of the present invention to provide a portable communication device with image producing capabilities, which is easy to assemble and is of a simple mechanical design. A second object of the invention is to provide a communication device comprising a first and second portion that are folded together when the communication device is used as a camera and unfolded when the communication device is used for face-to-face communication with another person. The portions are rotatably connected by means of a rotary support member which comprises an optical input for capturing images, wherein the rotary support member does not need to comprise any camera electronics.

A third object is to provide a portable communication device comprising two portions rotatably connected by means of a hinge, which is rigid and resistant to shock arising from e.g. a drop to the ground.

Yet another object is to provide an easy way to automatically direct the optical input of the communication apparatus in accordance with the folding and unfolding of the communication apparatus.

The above objects have been achieved by the inventive understanding that the camera itself does not have to be mounted in the rotary support member even though the optical input is located in the rotary support member. Instead, the camera is mounted in one of the portions of the communication device and an optical arrangement provides an optical path from the optical input in the rotary support member to the camera.

Moreover, the automatic alignment of the optical input is achieved by rigidly connecting the portion of the communication apparatus housing the camera with the rotary support member.

According to a preferred embodiment of the invention, the optical arrangement is in form of a prism or a mirror for enabling the optical input to be directed towards the user of the communication device when he or she is using the communication device for direct communication with another person. When the two parts of the communication device are folded together, e.g. when the communication device is used as an ordinary camera, the optical arrangement still directs the optical path from the optical input to the camera even though the optical input aims in another direction than when the communication apparatus is in an unfolded state.

The portable communication apparatus comprises a first housing portion and a second housing portion, a rotary support member which rotatably connects the first housing portion and the second housing portion, an image producing apparatus, an optical input for the image producing apparatus which is located in the support member, The image producing apparatus is located in the first housing portion or the second housing portion of the portable communication apparatus, and an optical arrangement extends an optical path of the image producing apparatus from the first housing portion or the second housing portion to the optical input located in the rotary support member.

The optical arrangement of the portable communication apparatus may comprise a prism, a mirror or a light guide.

The optical input of the portable communication apparatus may be aimed in a first direction when the communication apparatus is in an open state, and in a second direction when the communication apparatus is in a closed state.

The image producing apparatus of the portable communication apparatus may be a video camera or a still camera.

The portable communication apparatus may be a mobile telephone.

The portable communication apparatus comprises a first housing-portion and a second housing portion, a rotary support member which rotatably connects the first housing portion and the second housing portion, an image producing apparatus, and an optical input for the image producing apparatus which is located in the support member.

The connection between the first housing portion and the rotary support member is fixed, wherein the optical input of the image producing apparatus is rotatably fixed relative to the first housing portion.

The image producing apparatus of the portable communication apparatus may be located in the first housing portion.

The optical arrangement of the portable communication apparatus extends the optical path of the image producing apparatus from the first housing portion to the optical input in the rotary support member.

A solution to the above objects is defined by the appended independent patent claims. Other features, advantages and objects of the invention will appear from the following detailed disclosure of a preferred embodiment, from the appended drawings as well as from the subclaims.

BRIEF DESCRIPTION OF THE DRAWINGS

The present invention will now be described in more detail with reference to the appended drawings, in which.

DETAILED DISCLOSURE OF A PREFERRED EMBODIMENT

Figure 1A:
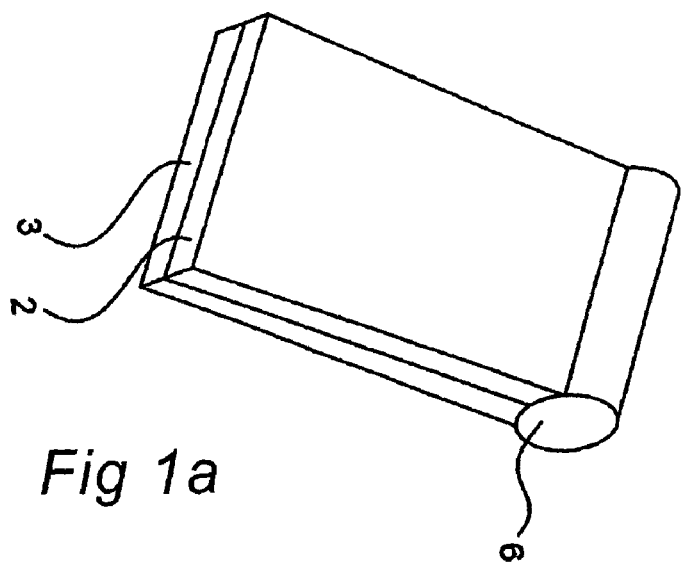
FIG. 1a is a schematic illustration of a mobile communication apparatus according to the invention in a closed position.
Figure 1B:
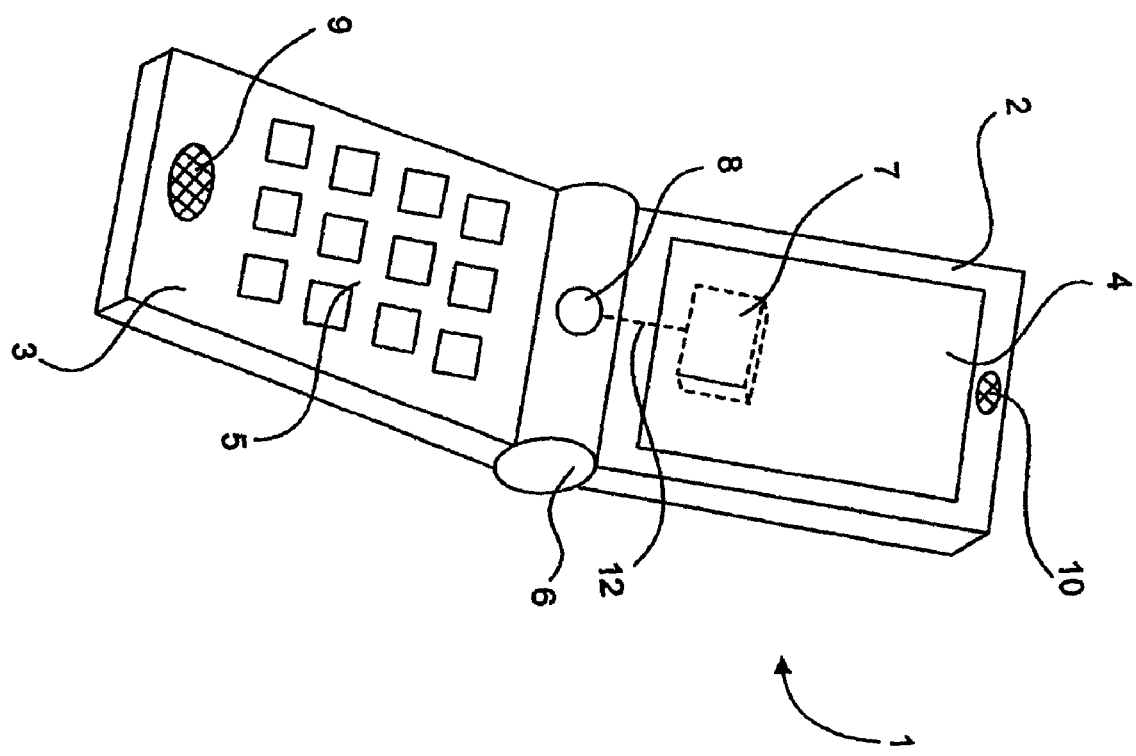
FIG. 1b is a schematic illustration of a mobile communication apparatus according to the invention in an open position.

A preferred embodiment of the present invention will now be disclosed with reference to the drawings. FIGS. 1a and 1b are perspective views of a portable communication apparatus 1 according to a preferred embodiment. The communication apparatus 1 comprises a first portion 2 and a second portion 3 which house the electronic circuitry of the communication apparatus. Moreover, the communication apparatus 1 includes a display 4, a keyboard 5, a rotary support member 6, an image producing apparatus 7, an optical input 8, a microphone 9, and a loudspeaker 10. In addition to this, the communication apparatus includes an internal optical arrangement 11a, b for creating an optical path 12 from the optical input 8 to the image producing apparatus 7.

The first 2 and second 3 portions of the communication apparatus 1 are rotatably connected by means of the rotary support member 6. The rotary support member is in a preferred embodiment rigidly connected to one of the housing portions. When the keyboard 5 and the display 4 of the communication apparatus 1 is not used, the two portions 2, 3 may be folded together as seen in FIG. 1a, wherein the communication apparatus 1 occupies much less space than in an open, unfolded position as seen in FIG. 1b. In a closed, folded position, the display 4 and the keyboard 5 will be protected from wear and tear arising from e.g. when the user is carrying the communication apparatus in a bag or in a pocket of a jacket. In an open position the first 2 and second 3 portions are unfolded to an angle of approximately 150° for enabling the user to access the keyboard 5 and the display 4 as well as using the microphone 9 and loudspeaker 10. However, the angle by which the two portions 2, 3 are unfolded may be adjusted to any appropriate value and the invention is hence not limited to a fixed opening angle.

An image producing apparatus 7, such as a still camera or a video camera is located inside the first 2 or second 3 portion of the communication apparatus for producing one or several image(s) of a generic object which may be any physical object that is present in a volume optically covered by the image producing apparatus 7 and the associated optical arrangement 11. The image producing apparatus is in a preferred embodiment in form of a digital video camera, i.e. the camera directly produces a digital video signal, or an analog video signal that is subsequently digitized by means of an analog-to-digital converter before further treatment in the communication apparatus 1. Various small sized digital video cameras are available on the market and are used e.g. as network cameras or web cameras for making it possible to send video sequences over the Internet. For simplicity reasons, the term camera will be used throughout the remainder of this text for designating an image producing apparatus 7 of the kind described above.

In a preferred embodiment, the optical input 8 is arranged in the rotary support member 6 of the communication apparatus 1. As is illustrated in FIGS. 2a and 2b, this arrangement makes it possible to direct the camera towards different locations by folding the first portion 2 and the second portion 3 at different angles.

Figure 2A:
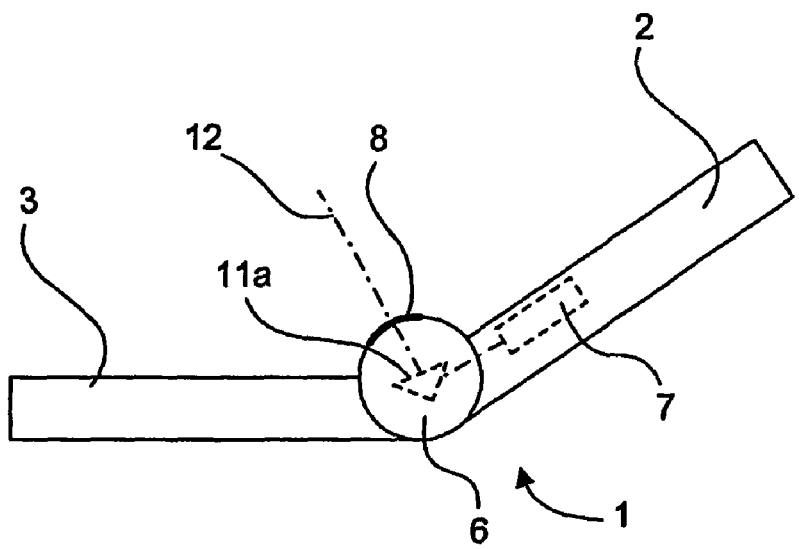
FIG. 2a is a schematic side view of a mobile communication apparatus in an open position according to a first embodiment of the invention.
Figure 2B:
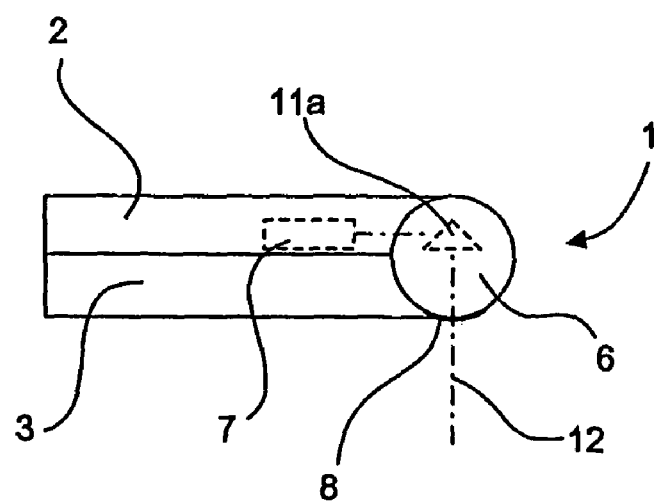
FIG. 2b is a schematic side view of a mobile communication apparatus in a closed position according to a first embodiment of the invention.

FIG. 2a illustrates the communication apparatus in an open position, wherein the user of the communication apparatus may use the keyboard 5, display 4, microphone 9, and loudspeaker 10 for communication with another person. In case the other person is using a similar communication apparatus, i.e. a communication apparatus with capability to receive and transmit video or still images, the display 4 of the communication apparatus 1 will display whatever the other persons camera is directed towards. Similarly, the other person will receive images from the camera 7 located in the communication apparatus 1.

As is seen in FIG. 2a, the optical path 12 of the camera 7 extends through the first portion 2 via an optical arrangement 11 in form of a prism 11a for deflecting the optical path by a predetermined angle to the optical input 8 of the communication apparatus 1. Since the camera 7 in this position, via the optical arrangement 11, is directed towards the user of the communication apparatus 1, the other person will receive images of the person using the communication apparatus 1.

It should be emphasized that the camera 7 may as well be located in the second portion 3 of the communication apparatus 1 as long as the optical arrangement 11 is adapted to extend the optical path 12 of the camera 7 from the second portion 3 to the optical input 8.

FIG. 2b illustrates the communication apparatus in a closed, folded position, wherein the camera 7 is directed in a direction approximately opposite to the direction in FIG. 2a. In this position the communication apparatus 1 functions similarly to an ordinary camera. The user of the communication apparatus 1 may send images or video sequences to another person by directing the camera towards the desired object. This, of course, implies that the communication apparatus 1 is communicating with another communication apparatus that is able to receive and process the information sent by the communication apparatus 1.

As is seen in FIG. 2b, the optical path of the camera 7 is deflected by the same amount as in FIG. 2a by means of the optical arrangement 11a. In a preferred embodiment, the optical arrangement 11a is fixed in the rotary support member 6 which makes it easy to mount since no moving parts are needed. The fixed mounting of the optical arrangement 11a also makes the communication apparatus 1 more resistant to shock, e.g. if the communication apparatus is dropped to the ground. The same applies to the camera 7 which is arranged in the first portion 2 or the second portion 3 since these portions provide more space for arranging the camera 7 in a shock-resistant manner than if the camera 7 is arranged in the actual rotary support member 6.

Another major advantage of the optical arrangement 11 according to the present invention is that no electrical components need to be arranged inside the rotary support member 6 for providing image producing capabilities of the communication apparatus 1. Instead the rotary support member may for example house an antenna 13 which otherwise would have to be mounted in one of the portions 2, 3 or on the outside of the communication apparatus 1.

Figure 3A:
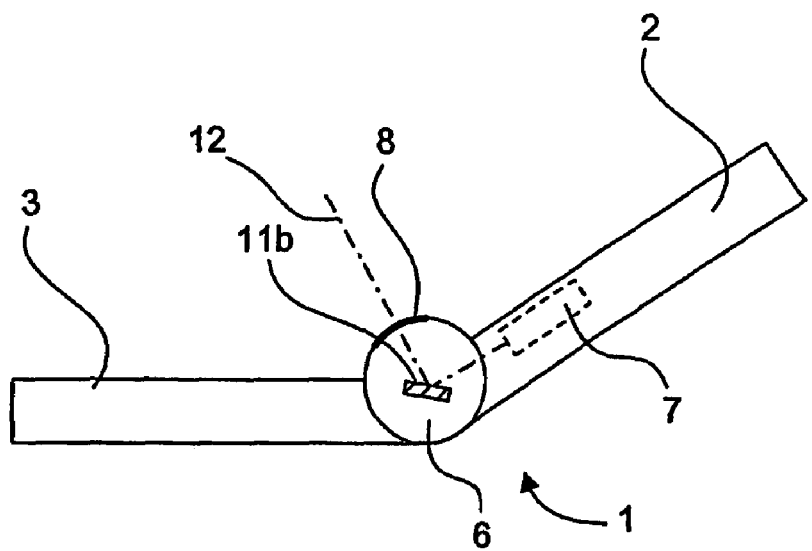
FIG. 3a is a schematic side view of a mobile communication apparatus in an open position according to a second embodiment of the invention.
Figure 3B:
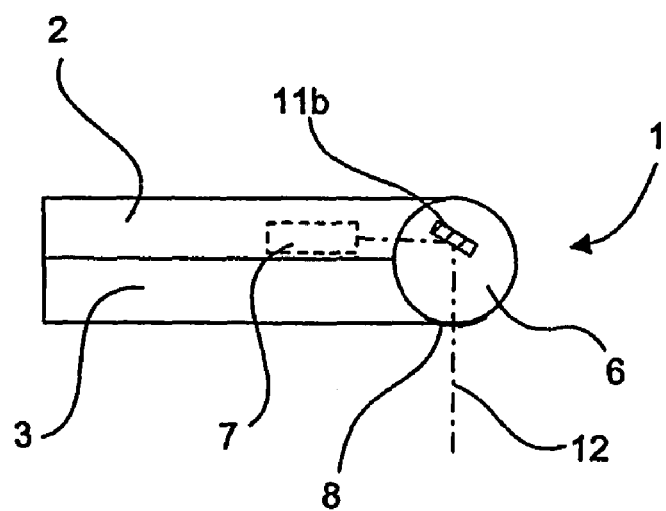
FIG. 3b is a schematic side view of a mobile communication apparatus in a closed position according to a second embodiment of the invention.

FIG. 3 illustrates a second embodiment, wherein the optical arrangement 11 is in form of a mirror 11b instead of a prism 11a. The function of the mirror 11b is hence the same as for the prism 11a, i.e. to deflect the optical path 12 of the camera 7. An advantage of using a mirror 11b compared to a prism 11a is that optical effects such as chromatic aberration will not be present when the light traveling from the optical input 8 is reflected in the mirror 11b surface.

Figure 4A:
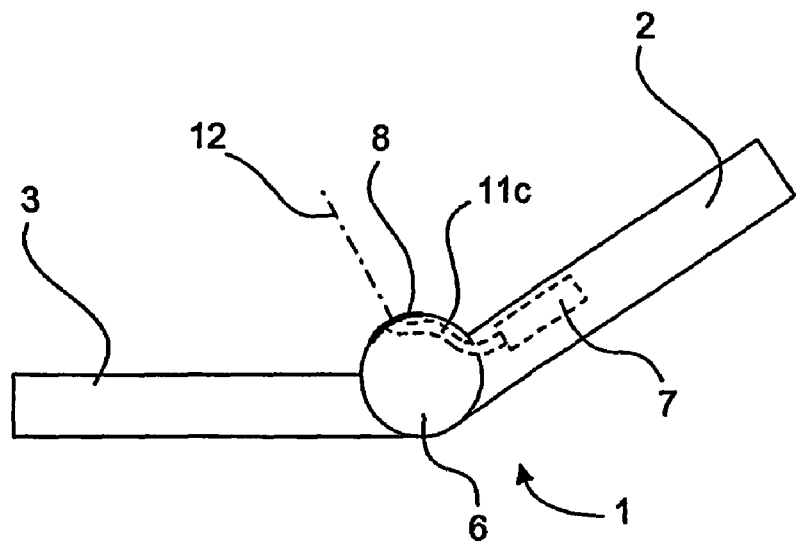
FIG. 4a is a schematic side view of a mobile communication apparatus in an open position according to a third embodiment of the invention.
Figure 4B:
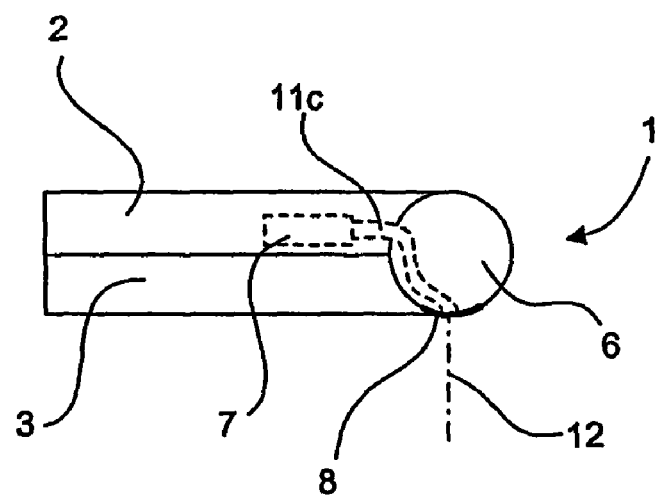
FIG. 4b is a schematic side view of a mobile communication apparatus in a closed position according to a third embodiment of the invention.

FIG. 4 illustrates a third embodiment of the present invention, wherein the prism 11a has been replaced by a light guide 11c being composed of thousands of small optical fibers that transmits a coherent optical image from one end of the light guide to the other. The light guide 11c offers the advantage of being able to turn the optical path 8 of the camera 7 in almost any direction inside the communication apparatus 1, which implies that the space inside the rotary support member may be used in a more effective manner since the optical path 8 of the camera 7 may be arranged to follow closely to the wall of the rotary support member 6 as seen in FIG. 4.

The present invention has been described above with reference to three embodiments. However, other embodiments than the three described above are equally possible within the scope of the invention, as defined by the appended independent claims, which is readily realized by a man skilled in the art.

The invention claimed is:

1. A portable communication apparatus comprising:
a first housing portion and a second housing portion,
a rotary support member rotatably connecting the first housing portion and the second housing portion,
an image producing apparatus,
an optical input for the image producing apparatus located in the support member, characterized in that
the image producing apparatus is located in the first housing portion or the second housing portion of the portable communication apparatus, and
an optical arrangement comprising a light guide composed of a plurality of optical fibers that extends an optical path of the image producing apparatus from the first housing portion or the second housing portion to the optical input located in the rotary support member,
wherein the rotary support member is movable in relation to the housing portion where the image producing apparatus is located.

2. A portable communication apparatus according to claim 1, wherein the optical input is aimed in a first direction when the communication apparatus is in an open state, and in a second direction when the communication apparatus is in a closed state.

3. A portable communication apparatus according to claim 1, wherein the image producing apparatus is a video camera.

4. A portable communication apparatus according to claim 1, wherein the image producing apparatus is a still camera.

5. A portable communication apparatus according to claim 1, wherein the portable communication apparatus is a mobile telephone.

* * * * *